United States Patent
Sarukkai et al.

(10) Patent No.: US 7,877,395 B2
(45) Date of Patent: Jan. 25, 2011

(54) SYSTEMS AND METHODS FOR IDENTIFYING PREMIUM CONTENT ITEMS IN A RESULT SET

(75) Inventors: Ramesh R. Sarukkai, Union City, CA (US); David Duane Hall, New York, NY (US); Wei Dai, Sunnyvale, CA (US); Ulf Sigurd Carlin, Jakobsli (NO)

(73) Assignee: Yahoo! Inc., Sunnyvale, CA (US)

( * ) Notice: Subject to any disclaimer, the term of this patent is extended or adjusted under 35 U.S.C. 154(b) by 263 days.

(21) Appl. No.: 11/641,342

(22) Filed: Dec. 18, 2006

(65) Prior Publication Data
US 2008/0147613 A1 Jun. 19, 2008

(51) Int. Cl.
*G06F 7/06* (2006.01)
(52) U.S. Cl. .............. 707/754; 707/767; 707/E17.014; 707/E17.028; 707/E17.109
(58) Field of Classification Search .......... 707/100, 707/104.1, 3, E17.014, E17.028, E17.109, 707/999.003, 754, 767
See application file for complete search history.

(56) References Cited

U.S. PATENT DOCUMENTS

| | | | |
|---|---|---|---|
| 2003/0028889 A1* | 2/2003 | McCoskey et al. | 725/91 |
| 2006/0136383 A1* | 6/2006 | Golla | 707/3 |
| 2006/0242129 A1* | 10/2006 | Libes et al. | 707/3 |
| 2007/0061363 A1* | 3/2007 | Ramer et al. | 707/104.1 |
| 2008/0060084 A1* | 3/2008 | Gappa et al. | 726/28 |

* cited by examiner

*Primary Examiner*—Tim T. Vo
*Assistant Examiner*—Shiow-Jy Fan
(74) *Attorney, Agent, or Firm*—Seth H. Ostrow; Ostrow Kaufman LLP (57) ABSTRACT

The present invention is directed towards systems and methods for identifying premium content items (such as video content items) that are responsive to a query. According to one embodiment, a method for identifying one or more items of video content responsive to a given query comprises receiving a query comprising one or more terms from a given user, identifying one or more items of video content responsive to the received query and generating a result set comprising one or more links to the one or more items of video content responsive to the received query. The one or more links the result set associated with items of premium video content are identified and the one or more links in the result set associated with items of premium video content are filtered on the basis information associated with the user from which the query was received.

17 Claims, 7 Drawing Sheets

SYSTEMS AND METHODS FOR IDENTIFYING PREMIUM CONTENT ITEMS IN A RESULT SET

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention is directed to indexing and searching for items of video content. More specifically, the present invention is directed to indexing one or more items of video content according to one or more indexing criteria to allow a user to search and display the video content responsive to a given query according to the one or more criteria.

BACKGROUND OF THE INVENTION

A number of techniques are known to those of skill in the art for delivering video content to users. Providers of video content maintain the video content in one or more data stores and maintain structured information that describes the video content. Providers of video content are limited, however, in that each provider allows users to search only over a given provider's library of items of video content, without any indication of when items unavailable in a given provider's library are available from an alternative source. For example, users at the Cinemanow.com web site are unable to view video content available at Movielink.com, and vice versa. Additionally, video content providers do not allow users to locate freely available items of video content available on the Internet, either alone or in conjunction with structured information that providers of video content make available for items of video content that they host.

In addition to video content made available for purchase or download from commercial providers of audio content, users may download video files from servers connected to the Internet. For example, a user may navigate to a given web site that is hosting video content and select a given item of video content for download to a local data store for playback. Although the video content and related information made available on servers connected to a network such as the Internet is unstructured, users may employ general search engines, such as Yahoo! Search, to perform keyword searches over content that the search engine indexes to identify items of video content. The search engine returns a result set comprising one or more links to files that contain the one or more keywords in the user search, which may, but not necessarily, include links to items of video content. Using a search engine in this manner, however, fails to search across the universe of structured information regarding items of video content that providers of video content maintain. Furthermore, there is no targeting of the result set specifically to items of video content and related information.

In order to overcome these and other shortcomings and problems associated with existing apparatuses and techniques for searching for and retrieving video content, embodiments of the present invention provide improved systems and methods for indexing and searching video content.

SUMMARY OF THE INVENTION

The present invention is directed towards systems and methods for identifying premium content items (such as video content items) that are responsive to a query. According to one embodiment, a method for identifying one or more items of video content responsive to a given query comprises receiving a query comprising one or more terms from a given user, identifying one or more items of video content responsive to the received query and generating a result set comprising one or more links to the one or more items of video content responsive to the received query. The one or more links in the result set associated with items of premium video content are identified and the one or more links in the result set associated with items of premium video content are filtered on the basis of information associated with the user from which the query was received. Receiving a query may comprises receiving a query from a user of a client device or an automated software process.

Identifying one or more items of video content responsive to the received query may comprise identifying one or more items of video content associated with one or more items of metadata that match or are similar to the one or more terms comprising the query. The one or more items of metadata describe or identify a given item of video content. A given item of metadata may comprise data identifying a content provider associated with a given item of video content, data identifying a given item of video content, a title of the item of video content, a summary of the item of video content, a subscription restriction associated with a given item of video content and licensing information associated with a given item of video content.

According to embodiments of the invention identifying one or more items of video content responsive to the received query comprises identifying one or more alternative queries related to the received query and identifying one or more items of video content responsive to the one or more alternative queries. Responsive video content may comprise premium video content. A given item of premium video content may comprise an item of video content for which payment is required, an item of video content for which a subscription is required, etc. Identifying the one or more links in the result set may alternatively, or in conjunction, comprise identifying the one or more links to items of video content associated with metadata identifying the items of video content as premium items of video content.

Links to items of premium video content are filtered on the basis of information associated with the user from which the query was received. Filtering according to one embodiment comprises removing the one or more links in the result set to items of premium video content on the basis of information associated with the user maintained in a user profile. Information associated with the user may be maintained in a user profile and may comprise an indication of whether the user is associated with a subscription for a given item of premium video content, payment information, etc.

BRIEF DESCRIPTION OF THE DRAWINGS

The invention is illustrated in the figures of the accompanying drawings, which are meant to be exemplary and not limiting, in which like references are intended to refer to like or corresponding parts, and in which.

DETAILED DESCRIPTION OF THE INVENTION

In the following description of embodiments of the invention, reference is made to the accompanying drawings that form a part hereof and in which is shown by way of illustration a number of specific embodiments in which the invention may be practiced. It is to be understood that other embodiments may be utilized and structural changes may be made without departing from the scope of the present invention.

Figure 1:
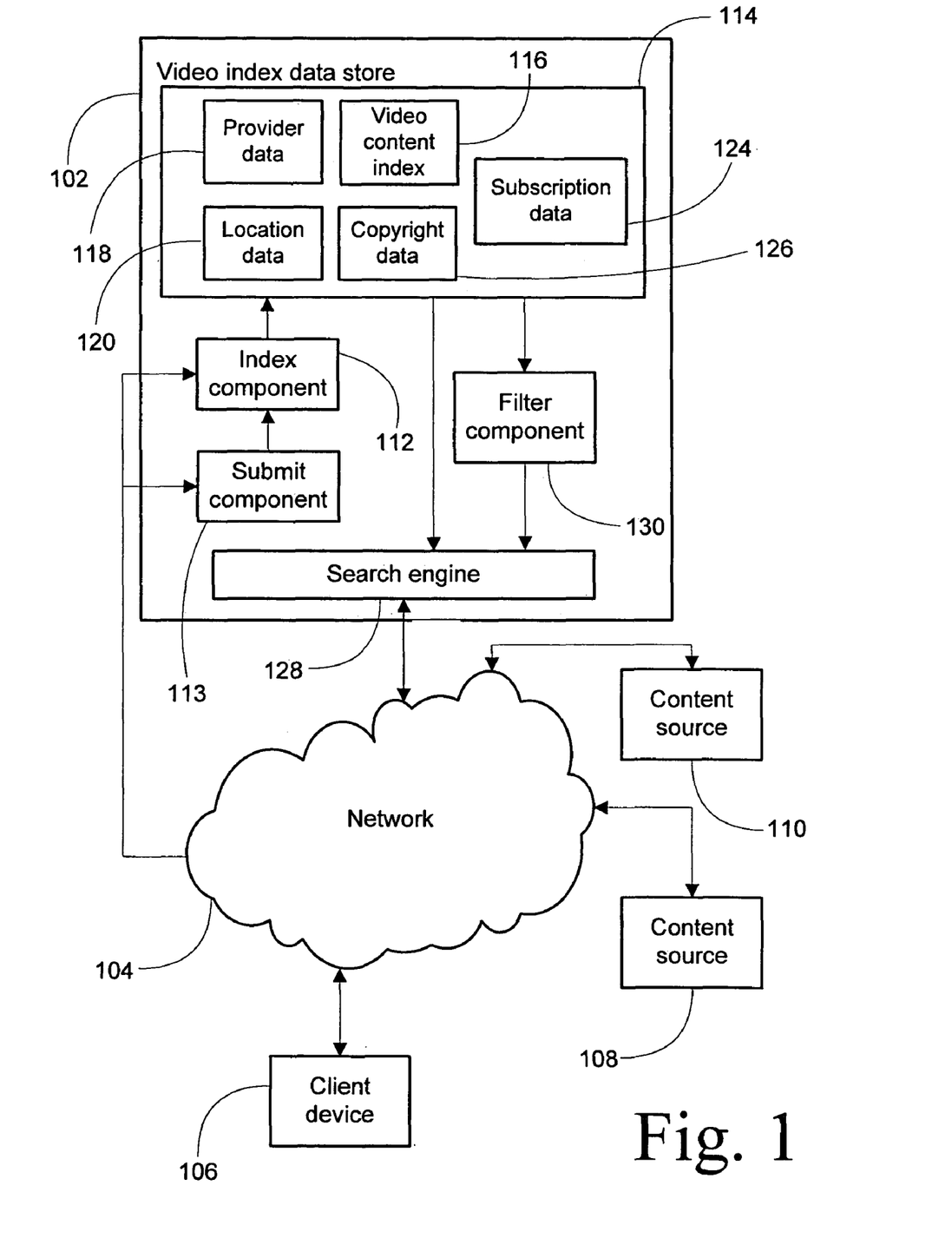
FIG. 1 is a block diagram illustrating a system for indexing and searching video content according to one embodiment of the present invention.

FIG. 1 presents a block diagram illustrating an embodiment of a system for indexing one or more items of video content and conducting searches for the same. According to the embodiment of FIG. 1, the system comprises one or more sources of video content 108 and 110, a search provider 102 and a client device 106. A given content source 110 hosts one or more items of video content, a given item of video content identifiable by an address, which may be a unique address, e.g., a Uniform Resource Locator ("URL"). The search provider 102 indexes video content from the one or more sources of video content 108 and 110 and provides functionality for searching the indexed video content, as well as routines for filtering the video content in a given responsive result set according to a number of criteria. A client device 106, is in communication with the search provider 102 and the one or more content sources 108 and 110 over a network 104, which may include combination of local and wide area networks implemented using a various media, such as wired and wireless technologies, and protocols, e.g., the Internet.

The client device 106 transmits a search query over the network 104 to the search provider 102, with the search provider providing a result set comprising one or more links to video content that is responsive to the search query. Selection of a link in the result set by the client device 106 initiates retrieval of the item of video content that the link identifies from a given content source 108 and 110. According to one embodiment of the invention, a client device 106 is a general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, etc. The client device 106 typically runs software applications (such as a web browser) that provide for transmission of queries to the search provider 102, as well as receipt and display of result sets responsive to the queries.

According to one embodiment, the search provider 102 comprises an index component 112, a submit component 113, a video index data store 114, a search engine 128 and a filter component 130. Those of skill in the art recognize that the search provider may utilize more or fewer components and data stores, which may be local or remote with regard to a given component or data store and in communication over the network 104. Using the network 104, the search provider 102 is capable of accessing content sources 108 and 110 that host content items a user may wish to locate through use of the search engine 128 at the search provider 102. The search provider 102 may communicate with one or more content sources 108 and 110 for maintaining cached copies of content items that the content sources 108 and 110 host. The collection of information regarding content items, as well as content items themselves, is referred to as "crawling", and is the process by which the search provider 102 collects information upon which the search engine 128 performs searches. Exemplary methods for crawling information on a network is described in commonly owned U.S. Pat. No. 6,021,409, entitled "METHOD FOR PARSING, INDEXING AND SEARCHING WORLD-WIDE-WEB PAGES," the disclosure of which is hereby incorporated by reference in its entirety.

The search provider 102 crawls content sources 108 and 110 in communication with the network 104, such as the Internet, which may comprise collecting combinations of content items and information regarding the same. An index component 112 parses and indexes the content items and related information that the search provider 102 collects through the crawling process. An index component 112 is operative to receive information regarding one or more items of video content and index the received information for storage according to one or more data structures 116, 118, 120, 124 and 126 in the video index data store 114. The index component 112 generates a video content index 116 at the video index data store 114 that defines a structure for the items of video content and related information 118, 120, 124 and 126 that allows for location and retrieval of the content items and related information.

According to one embodiment of the invention, the index component 112 creates a content index of word-location pairs that allows a search engine 128 to identify specific content items and information regarding the same in response to a query, which may be from a user, software component, automated process, etc. Exemplary methods for indexing information is described in commonly owned U.S. Pat. No. 5,745,889, entitled "METHOD FOR PARSING INFORMATION OF DATABASE RECORDS USING WORD-LOCATION PAIRS AND METAWORD-LOCATION PAIRS," the disclosure of which is hereby incorporated by reference in its entirety. The index component 112 writes the one or more indexes 116, 118, 120, 124 and 126 to the video index data store 114 for persistent storage and use by other components of the search provider 102.

According to one embodiment, the index component 112 is operative to parse information regarding the one or more items of video content available from the one or more content sources 108 and 110 for storage as one or more indexes at a video index data store 114. The video index data store 114 maintains a video content index 116 that identifies links to items of video content. The video index data store 114 may also maintain one or more data structures that are related to the links to items of video content that the video content index 116 maintains. A provider index 118 associates information regarding the provider of an item of video content with a link to an item of video content in the video content index. Provider data in the provider index 118 includes, but is not limited to, pricing information for items of video content, paid placement information for an item of video content, etc. Similarly, the video content data store may maintains other indexes to associate information with a given item of video content, such as a location index 120 to associate location data, a copyright index 126 to associate copyright or licensing information and a subscription index 124 to associate subscription information. It should be recognized by those of skill in the art that the indexes 116, 118, 120, 124, 126 may be implemented using one or more data storage techniques, e.g., a relational database comprising tables of related data. It should be further noted that the video index data store need not maintain separate data structures and that links to items of video content may be stored in a unified data structure or index with information regarding the items of video content, e.g., on a per-item of video content basis.

In addition to receiving video content and information regarding the same for storage and indexing, respectively, the search provider 102 may implement a submit component 113 through which a provider of video content may provide one or more video feeds that identify video content at a given content source 108 and 110, as well as information regarding the same. The submit component receives the feed and parses the information for storage at the video index data store 114 in accordance with one or more data structures 116, 118, 120, 124, 126. The feed may comprise an item of video content. Alternatively, or in conjunction with the foregoing, the feed may comprise a link to an item of video content, e.g., a URL. The feed may also comprise information regarding the item of video content including, but not limited to, information regarding the provider of the item of video content (e.g., movie studio, etc.), information describing the item of video content (title, summary, cast and crew, etc.), information regarding terms and conditions under which provider is making the item of video content available (e.g., copyright or other license controls, payment for viewing, subscription requirements, etc.) and placement information for the item of video content. A given feed may identify one or more items of video content.

The search engine 128 at the search provider 102 receives a query from a client device 106 for identification of items of video content that are responsive to the query, e.g., fall within the scope of the query. A typical query has one or more terms. For example, the query "2005 Lincoln continental" contains three terms and is referred to as a three-term query. Similarly, a query containing only one term is referred to as one-term query, a query containing two terms is a two-term query, etc. A space or other delimiter character that a search engine 128 at the search provider 102 comprehends delimits individual terms comprising a query.

The search engine 128 utilizes the search terms to identify a result set comprising items of video content that are responsive to the terms in the search query, which the search engine 128 passes to a filter component 130. According to one embodiment of the invention, the user may submit one or more filter criteria to the search engine 128 in addition to a search query. The filter component 130 receives the filter criteria in addition to the result set and filters or otherwise restricts links to items of video content to those items of video content that are associated with information that matches the filter criteria. For example, where the use indicates that the result set should only include links to items of video content associated with license information indicating that derivative works are allowed, the filter component 130 restricts the result set accordingly. The search provider 102 provides a result set that comprises one or more links to items of video content that are responsive to the search query. Selection of a link in the result set by the client device 106 initiates retrieval of the item of video content that the link identifies from a given content source 108 and 110.

Figure 2:
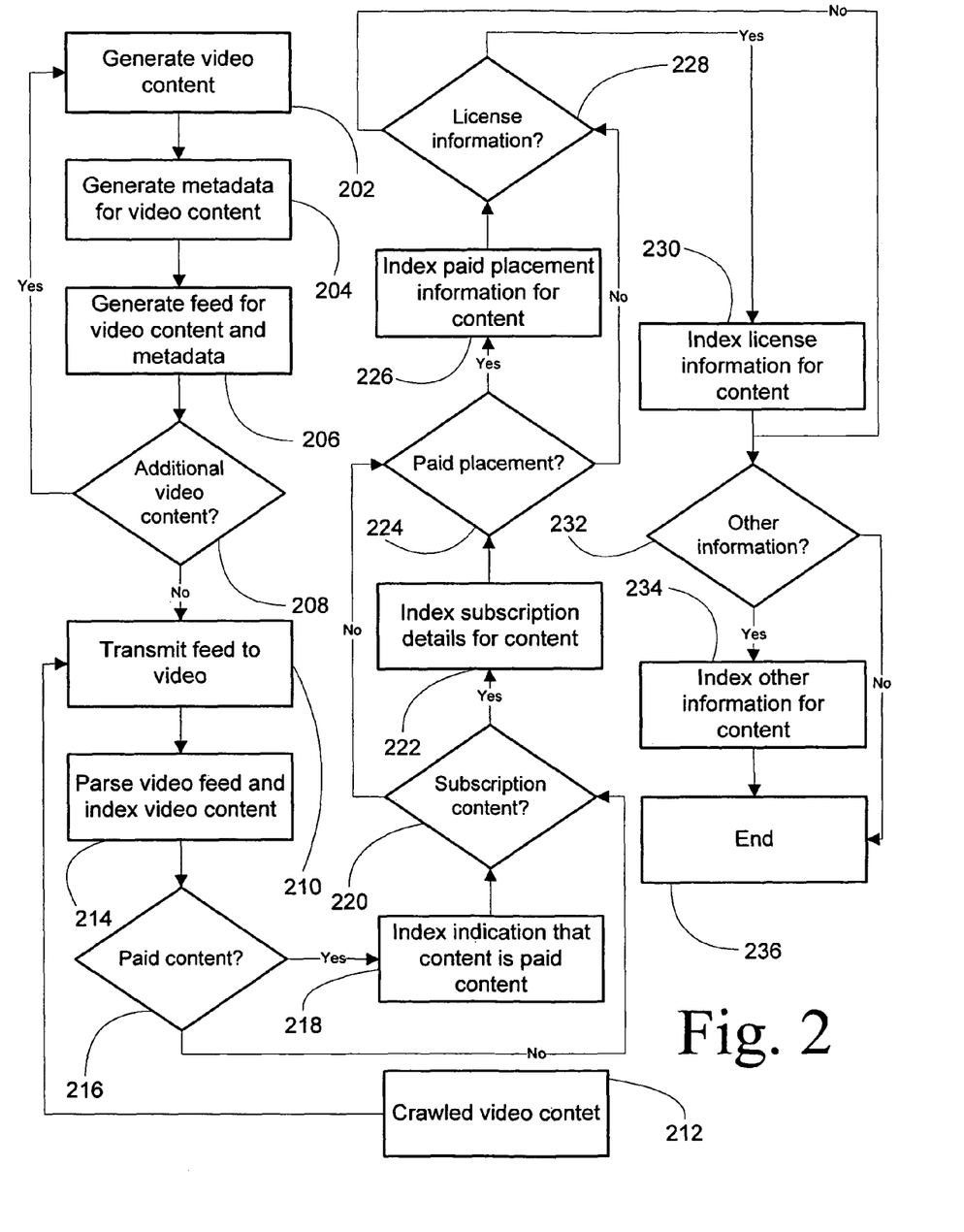
FIG. 2 is a flow diagram illustrating a method for indexing video content according to one embodiment of the invention.

The index component 112 at the search provider 102 may receive items of video content for caching and information regarding the same for indexing from submission feeds, as well as by crawling video content sources 108 and 110 over a network 104. FIG. 2 illustrates one embodiment of a method for providing video content and information regarding the same to a search provider for storage and indexing. According to FIG. 2, a provider of video content generates an item of video content for consumption, e.g., playback, by one or more client devices, step 202. The provider of video content also generates metadata that describes the item of video content, step 204. For example, the metadata may comprise information regarding whether the item of video content is paid video content, which may be offered at a paid premium over free items of video content, available on a subscription basis, paid to be placed or ranked at a position in a result set when the item of video content is responsive to a given query, available according to certain license terms or conditions, e.g. creative commons limitations on reproduction, derivation and distribution, as well as other information.

The producer of the item of video content generates a feed for the video content and metadata, step 206. According to one embodiment, the feed comprises a given item of video content. Alternatively, or in conjunction with the foregoing, the feed comprises the metadata that the producer of the item of video content generates to describe the item of video content. Accordingly, the producer of the item of video content has flexibility in determining the specific item of content or related information that the feed comprises. According to one embodiment, the feed is an MMS feed that provides a transport mechanism for pushing the specific item of content or related information from a provider of video content to the search provider for storage and indexing as is appropriate. The video content provider may also implement the feed as one or more XML files that identify the one or more items video content and information regarding the same. The system performs a check to determine is addition items of video content or information regarding the same are to be included in the feed, step 208. Where the check evaluates to true, step 208, processing returns to step 202 where the producer of video content generates a subsequent item of video content.

When the feed is complete, the producer of video content transmits the feed to the search provider for storage and indexing, step 210. The search provider may also receive information regarding items of video content through the crawling process, step 212. Although information regarding items of video content that the search provider collects through the crawling process is not contained as part of a feed, the search provider may parse any available information regarding a crawled item of video content for processing according to the feed processing techniques discussed herein. When the search provider receives the feed that the producer of video content transmits, the search provider parses the feed to identify the constituent components of the feed, step 214. According to one embodiment where the feed is an XML file that identifies the item of video content and information regarding the same, the XML file is traversed to identify the discrete items of information comprising the XML file, e.g., title and author information, pricing, subscription restrictions, placement information, licensing restrictions and other information regarding.

The system performs a check to determine if the item of video content that the feed identifies is a paid item of video content, step 216. As the feed may indicate, certain items of video content may be paid items of video content such that a user who wishes to retrieve or playback the item of video content must pay a fee to the provider of the item of video content (or another party who is authorized to collect payment for retrieval and playback of the item of video content). Where the feed identifies that the item of video content is a paid item of video content, step 216, the system indexes an indication that the item of video content is a paid item of video content, step 218, e.g., storing an indication in one or more data structures in the video index data store.

Where the feed does not indicate that the item of video content is a paid item of video content, step 216, processing continues with the performance of a check to determine if the item of video content is available on a subscription basis, step 220. As the feed may indicate, certain items of video content may be available on a subscription basis such that the user who is attempting to execute a retrieval or playback operation for a given item of video content is prevent from executing the operation where the user does not have a valid subscription. For example, where a provider of video content makes video content available on a subscription basis, the user must have a software application, digital keys or other valid credentials that identify the user a possessing a valid subscription, which allows retrieval and playback of the video content. Users without valid credentials are prevented from retrieval or playback of the video content, depending on the particular implementation of the subscription service. Where the feed identifies that the item of video content is available on a subscription basis, step 220, the system indexes an indication that the item of video content is available on a subscription basis, step 222, e.g., storing an indication in one or more data structures in the video index data store.

Where the feed does not indicate that the item of video content is available on a subscription basis, step 220, processing continues with the performance of a check to determine if the provider of the item of video content has paid for placement of the item of video content, step 224. According to embodiments of the present invention, a provider of an item of video content may pay for placement of the item of video content in a result set where the item of video content is responsive to a given query from a user. According to one embodiment, the provider of an item of video content may enter an agreement with the search provider to pay for placement of a link to the item of video content at a specific location in a result set when the item of video content is responsive to a given query from a user. Alternatively, the provider of an item of video content may enter an agreement with the search provider to pay for inclusion of a link to the item of video content in a result set when the item of video content is responsive to a given query from a user. Other embodiments contemplate that the provider of video content may enter into an agreement with the search provider to pay for inclusion of a link to the item of video content in the video content index that the search provider maintains. Those of skill in the art recognize that combinations of the foregoing fall within the scope of the present invention. Where the feed identifies that the provider of the item of video content has paid for placement of the item of video content, step 224, the system indexes an indication that the item of video content is available on a subscription basis, step 226, e.g., storing an indication in one or more data structures in the video index data store.

Where the feed does not indicate that the provider of the item of video content has paid for placement of the item of video content, step 224, processing continues with the performance of a check to determine if licensing information is available for the item of video content, step 228. Licensing information may be any information that provides indicia regarding the manner in which a user may utilize a given item of video content. According to one embodiment of the invention, licensing information, also referred to herein as copyright control information, is the creative commons license that identifies how a user may utilize a given item of video content (use, distribute, make derivative works, etc.) and the conditions under which the user may utilize the item of video content. Those of skill in the art recognize that the provider of the item of video content may implement other licensing information, which is contemplated as falling within the scope of the invention. Where the feed identifies that the item of video content has licensing information, step 228, the system indexes an indication of the licensing information for the item of video content, step 230, e.g., storing an indication in one or more data structures in the video index data store.

Where the feed does not indicate that the item of video content has licensing information, step 228, processing continues with the performance of a check to determine if other information is available for the item of video content, step 232. Other information in the may comprise any additional information that describes or indicates any features of the item of video content. Where the feed identifies other information regarding the item of video content, step 232, the system indexes an indication of the other information for the item of video content, step 234, e.g., storing an indication in one or more data structures in the video index data store. Where there is no other information to index, step 232, or after the indexing of any available other information, step 234, the indexing process completes, step 236.

Figure 3:
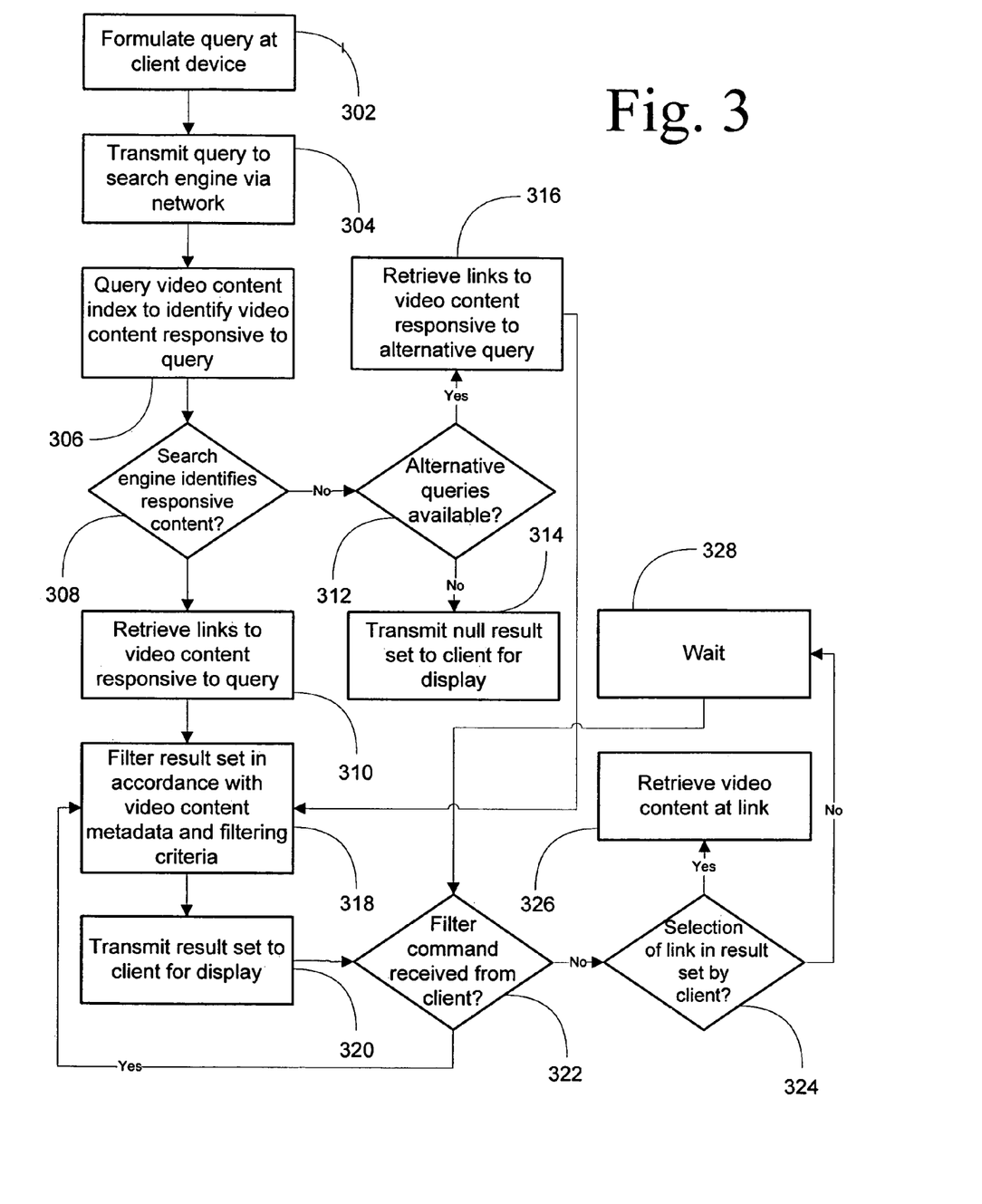
FIG. 3 is a flow diagram illustrating a method for searching and displaying video content according to one embodiment of the invention.

Users who desire to locate available items of video content may issue one or more queries to the search engine at the search provider to search the one or more indexes for items of video content that are responsive to the one or more queries. FIG. 3 presents one embodiment of a method for utilizing the search engine at the search provider to locate and retrieve one or more items of video content. The process begins with the formulation of a query by a user utilizing a client device, step 302. The formulation of the query may also include the formulation of filtering criteria that the search engine uses to filter links to items of video content the result set. The user transmits the query to the search engine at the search provider via a network, step 304, which may include the transmission of the query over a combination of one or more local and wide area networks, e.g., the Internet.

The search engine at the search provider receives the query over the network from the user and uses the query terms to query a video content index to identify video content that is responsive to the terms comprising the query from the user, step 306. The search provider performs a check to determine if links to items of video content exist in the video content index that are responsive to the user query, step 308. Where items of video content do not exist in the index that are responsive to the user query, the search provider may perform a check to determine if alternative queries are available, step 312. According to one embodiment, the search provider attempts to identify one or more alternative queries that are related to the user query. One exemplary technique for identifying related queries is described in U.S. Provisional Patent Application No. 60/736,133, "MODULAR OPTIMIZED DYNAMIC SET," filed on Nov. 9, 2005, the disclosure of which is hereby incorporated herein by reference in its entirety. Where the search provider is unable to locate links to items of video content that are responsive to the user query, step 308, and no alternative queries are available (or no links to items of video content exist in the video content index that are responsive to any available alternative queries), step 312, the search provider transmits a null result set to the client for display to the user, step 314.

Where the check at step 308 evaluates to true, e.g., links to items of video content exist in the index that are responsive to the user query, the search provider retrieves links to items of video content that are responsive to the user query, step 310. Similarly, where the check at step 308 evaluates to false but the check at step 312 evaluates to true, e.g., link to items of video content exist in the index that are responsive to one or more available alternative queries, the search provider retrieves links to items of video content that are responsive to the one or more alternative queries, step 316. Program flow continues with the search provider filtering the result set in accordance with the information regarding a given item of video content and any filter criteria that the user provides, step 318. For example, where the user provides filtering criteria with a given query that indicates that the result set is to exclude an paid content, the search provider utilizes the information regarding the links to items of video content in the result set to identify any links to paid items of video content, which it filters or otherwise removes from the result set. Where the user does not provide any filtering criteria, the search provider transmits the result set to the client for display to the user, step 320.

The client device receives the result set comprising links to one or more items of video content for display to the user and awaits a user interaction with filtering controls or items in the result set. The client device performs a check to determine if the user submits a filter command to filter the items in the result set, step 322. For example, the user may determine upon review of links to items of video content in the result set that he or she is only interested in freely available items of video content. Accordingly, a user interface that the client device presents provides an option to restrict the links in the result set to only those links that are for freely available items of video content, which causes the client to filter out a given item of video content from the result set where information regarding the given item of video content identifies the item as a paid item of video content. Alternatively, the client may pass the command back to the search provider to apply the filter and retransmit the filtered result set to the client device.

Where the user does not issue a filter command, step 322, the client device performs a check to determine if the user selects a link to an item of video content from the result set, step 324. Where the user selects a link, step 324, the client device communicates with the content source that hosts the item of video content that the user selects for retrieval, step 326. If the user does not issue a command to filter the links to items of video content in the result set, step 322, and does not select a link to an item of video content in the result set, step 324, the system enters a wait state, step 328. Checks are periodically performed to determine if the use issues a filter command or selects a link to an item of video content in the result set to take appropriate action.

Figure 4:
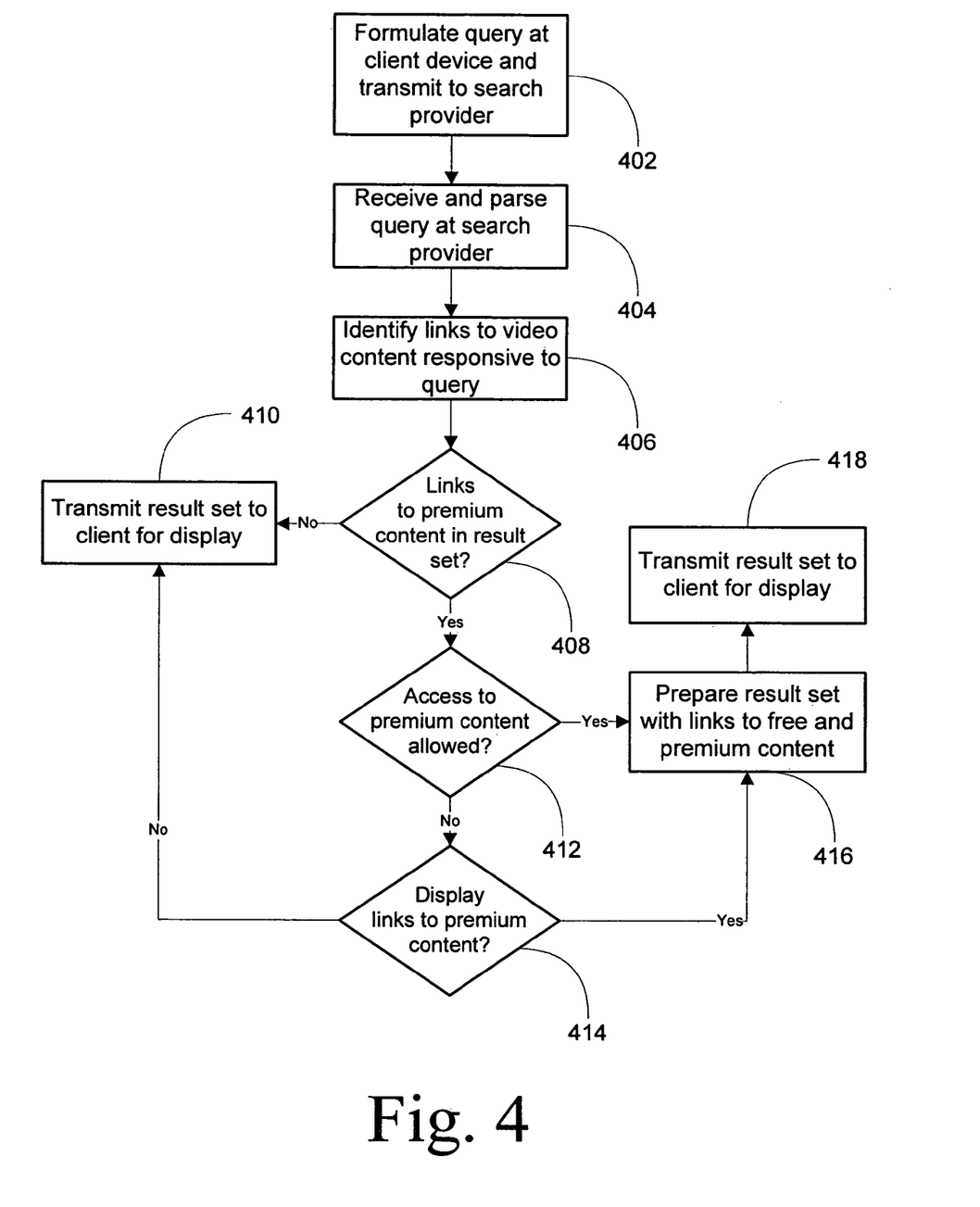
FIG. 4 is a flow diagram illustrating a method for searching and displaying premium video content according to one embodiment of the invention.

As discussed above, the user may limit the links to items of video content in a result set to links to paid video content, also referred to as premium content. FIG. 4 illustrates one embodiment of a method for retrieving links to items of premium video content. The method begins with the user formulating a query, which may be at the client device, for transmission to the search provider, step 402. The search provider receives the query from the user, which it parses to determine the terms that comprise the query, step 404, and identifies links to items of video content in a video content index that are responsive to the query, step 406.

A link to a given item of video content is associated with or related to one or more pieces of additional information. According to one embodiment, a link to an item of video content is associated with pricing information for the item of video content that the link identifies, e.g., items of premium video content. The system performs a check to determine if the result set comprises one or more links to premium video content items, step 408. The check may include retrieval of information identifying whether the item of video content requires payment, as well as payment terms and mechanisms. Where the result set does not comprise one or more links to premium video content items, the search provider transmits the result set to the client device for display to the user, step 410.

If the result set comprises one or more links to items of premium video content, step 408, the system performs a check to determine if the user is allowed to retrieve the one or more items of premium video content, step 412. For example, the provider of an item of premium video content may require that a user become a member of a video content distribution service to retrieve the item of premium video content. According to one embodiment, the check is performed for each link to an item of premium video content in a given result set, thereby allowing the user to view links to items of responsive video content to which the user has sufficient retrieval rights. Those of skill in the art recognize a number of mechanisms that the system may employ to determine if a user has sufficient rights to a given item of premium video content, step 412, for example, by examining a user profile in view of information identifying whether the item of video content requires payment, as well as payment terms and mechanisms.

Where the check at step 412 evaluates to false, the system performs a check to determine if the result set should include links to the items of premium video content, step 414. Where the check evaluates to false, the search provider transmits the result set to the client device for display to the user that does not include links to items of premium video content and comprises only links to free video content, step 410. Where the check at either step 412 or step 414 evaluate to true, the system prepares a result set that comprises links to items of premium video content and links to items of free video content, step 416. The search provider transmits the result set to the client device for display to the user, step 418. As discussed in connection with FIG. 3, the client device may provide controls (which may be transmitted to the client by the search provider with or without the result set) to selectively display combinations of free and premium content.

Figure 5:
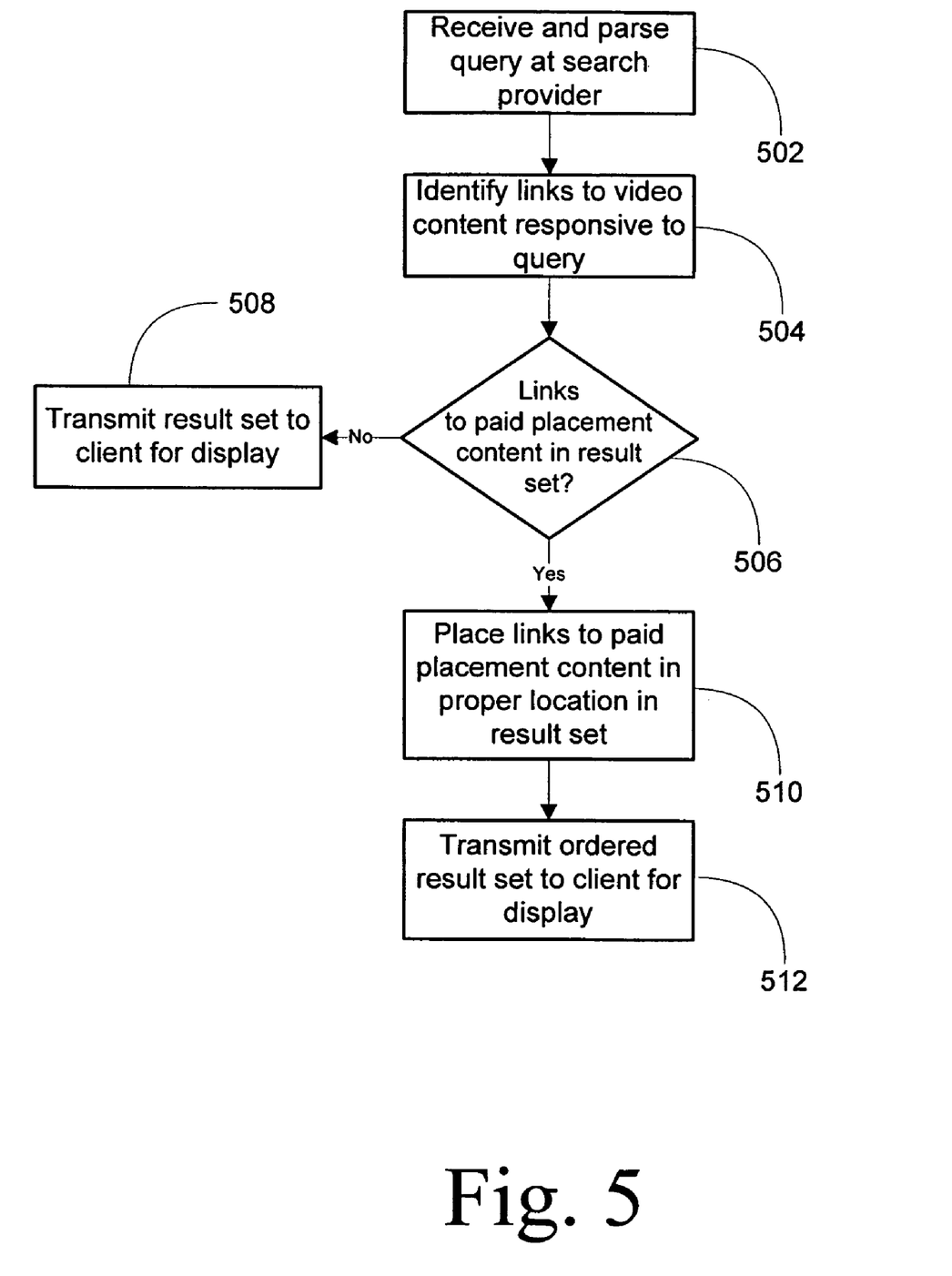
FIG. 5 is a flow diagram illustrating the distribution of paid placement content in a result set according to one embodiment of the invention.

The search provider may index a given link to an item of video content in conjunction with paid placement information. According to one embodiment, payment only ensures that a link to a given item of video content appears in the video content index. Alternatively, the indexed payment information indicates the position at which a link to a given item of video content is to appear when the given item of video content is responsive to a user query. FIG. 5 illustrates one embodiment of a method for the paid placement of video content items in a result set. The method begins with the search provider receiving a query from the user, step 502, which it parses to determine the terms that comprise the query and identifies links to items of video content in a video content index that are responsive to the query, step 504.

The search provider parses the result set to determine if the result set comprises links to items of video content for which the provider of the item of video content has paid for placement at a given position in the result set, step 506. Where the check evaluates to false, the search provider transmits the result set to the client device for display to the user, step 508. The result set may be ordered or ranked according techniques known to those of skill in the art, e.g., according to the relevance of the items of video content in the result set to the terms of the user query.

Where the result set comprises links to items of video content for which the provider of the item of video content has paid for placement at a given position in the result set, step 506, the search provider places the items of video content at a proper location or rank in the result set to form a reordered result set, step 510. For example, where a provider of an item of video content pays for placement of a given item of video content at position two in a result set, the search provider reorders the result set such that the given item of video content appears at position two in a result set where the item of video content is responsive to a user query. The search provider transmits the reordered result set to the client device from which the query was received for display to the user, step 512.

Figure 6:
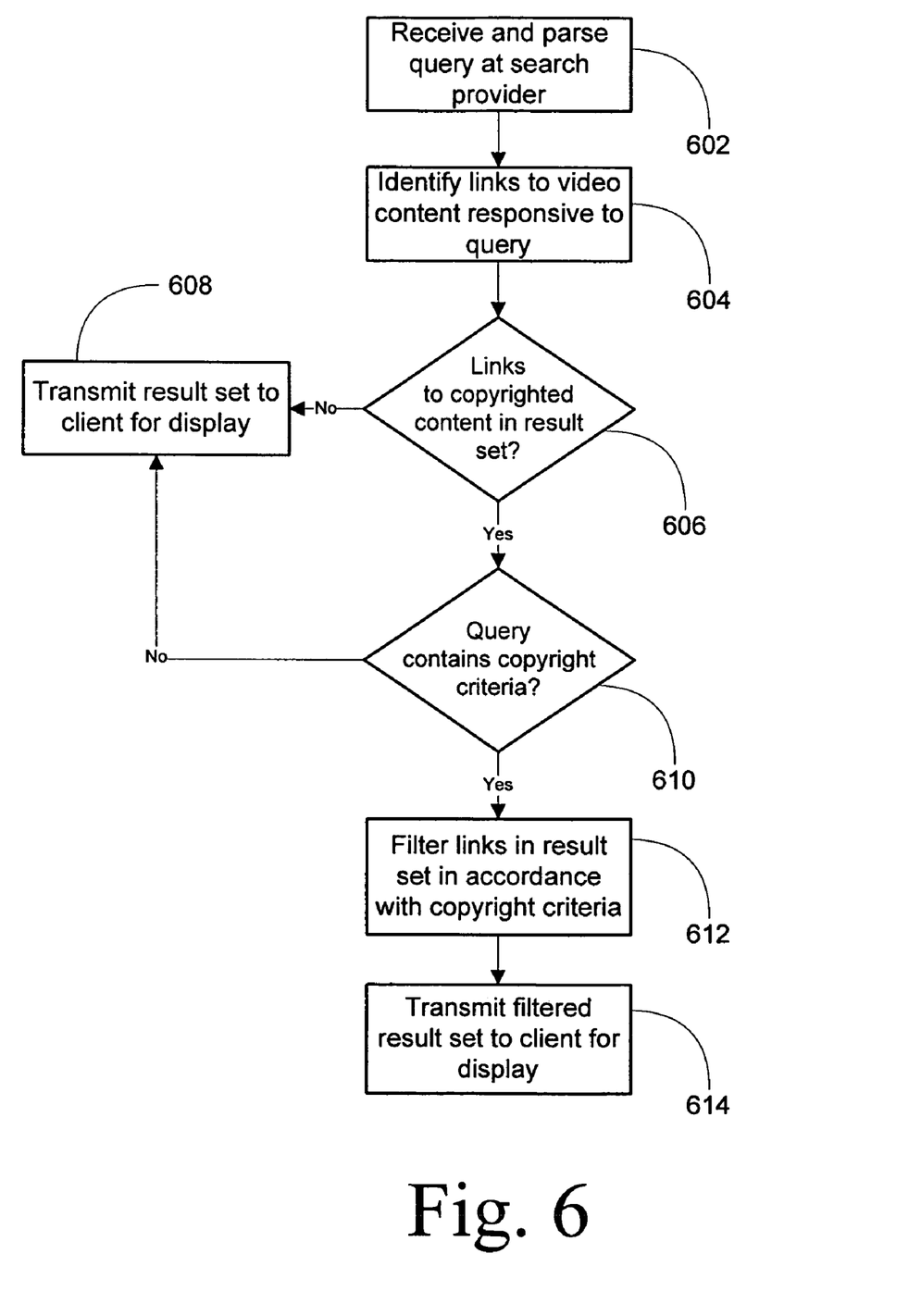
FIG. 6 is a flow diagram illustrating a method for searching and displaying copyrighted video content according to one embodiment of the invention.

In addition to the foregoing, the user may limit the links to items of video content in a result set to those links that satisfy certain licensing or copyright criteria that the user provides. FIG. 6 illustrates one embodiment of a method for retrieving and providing links to items of video content that satisfy certain licensing of copyright criteria. The method begins with the search provider receiving a query from the user, step 602, which it parses to determine the terms that comprise the query and identifies links to items of video content in a video content index that are responsive to the query, step 604. The system performs a check to determine if the result set comprises links to items of video content indexed in accordance with licensing or copyright information, step 606.

Where the result set does not comprise links to items of video content indexed in accordance with licensing or copyright information, the search provider transmits the result set to the client device for display to a user, step 608. If the check at step 606 evaluates to true, the system performs a check to determine if licensing or copyright criteria is present with the user query, step 610. According to one embodiment, a user may provide the one or more copyright or licensing criteria to the search provider separate from the query. Where no criteria are present, the search provider transmits the result set to the client device for display to the user, step 608. If, however, the check at step 610 evaluates to true, the system filters the links in the result set to include links where the licensing or copyright information matches one or more copyright or licensing criteria, step 612. The system transmits the filtered result set to the client device for display to the user, step 614.

Figure 7:
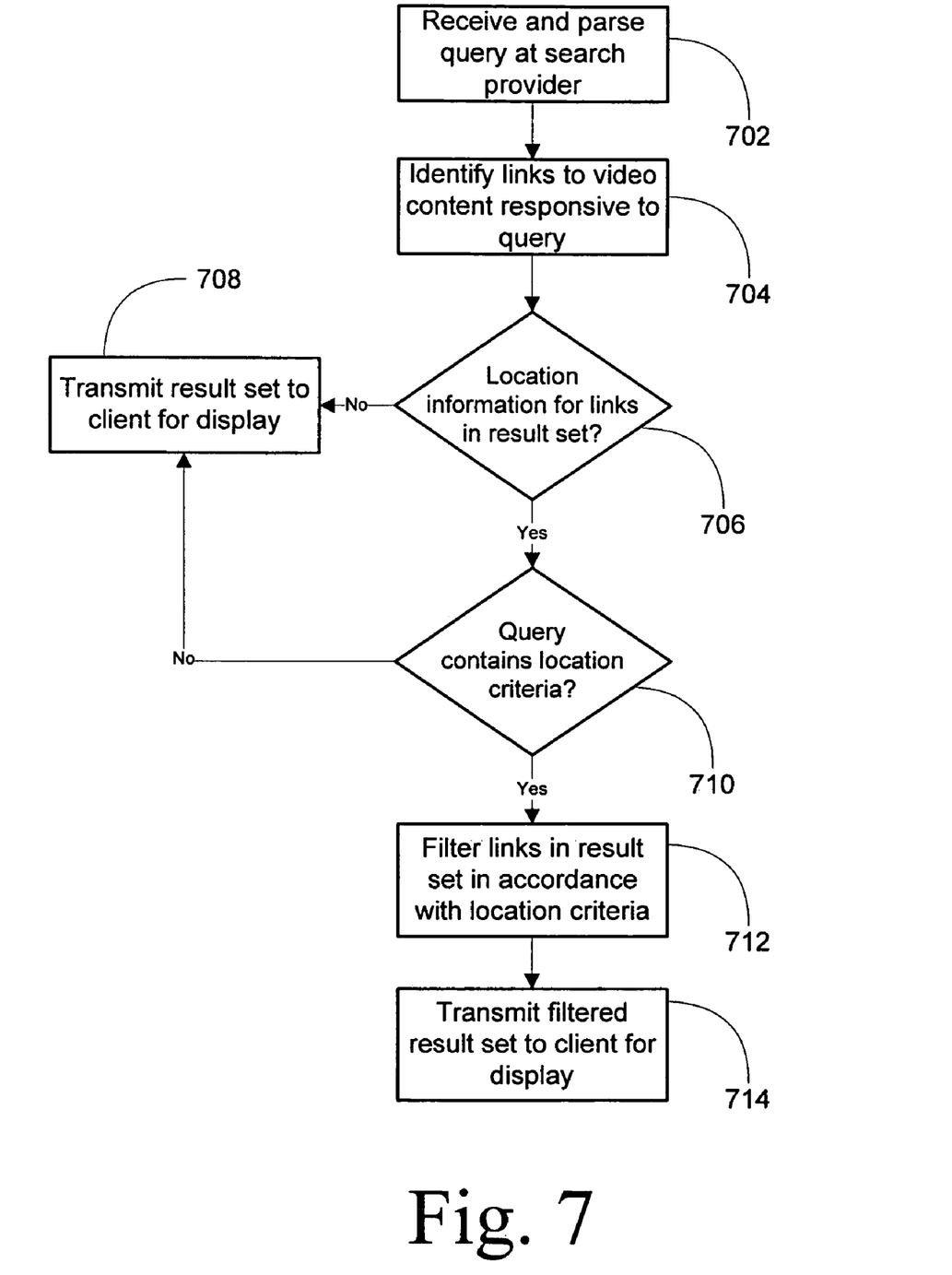
FIG. 7 is a flow diagram illustrating a method for searching and displaying location based video content according to one embodiment of the present invention.

Similar to other criteria over which a user may search and view items of video content, the user may limit the links to items of video content in a result set to those links that satisfy certain location information. FIG. 7 illustrates one embodiment of a method for retrieving and providing links to items of video content that satisfy certain location criteria. The method begins with the search provider receiving a query from the user, step 602, which it parses to determine the terms that comprise the query and identifies links to items of video content in a video content index that are responsive to the query, step 604. The system performs a check to determine if the result set comprises links to items of video content indexed in accordance with location information, step 606.

Where the result set does not comprise links to items of video content indexed in accordance with location information, the search provider transmits the result set to the client device for display to a user, step 608. If the check at step 606 evaluates to true, the system performs a check to determine if location criteria is present with the user query, step 610. According to one embodiment, a user may provide the one or more copyright or licensing criteria to the search provider separate from the query. Where no criteria are present, the search provider transmits the result set to the client device for display to the user, step 608. If, however, the check at step 610 evaluates to true, the system filters the links in the result set to include links where the location information matches the location criteria that the user provides, step 612. The system transmits the filtered result set to the client device for display to the user, step 614.

FIGS. 1-7 are conceptual illustrations allowing for an explanation of the present invention. It should be understood that various aspects of the embodiments of the present invention could be implemented in hardware, firmware, software, or a combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method for identifying one or more items of video content responsive to a given query in a computerized system, the method comprising:
    electronically receiving a query comprising one or more terms from a given user;
    electronically identifying one or more alternative queries related to the received query, wherein the one or more alternative queries are generated using a query-candidate pair model based upon logs of user web accesses, wherein a web access comprises a web search, user identifier, and timestamp;
    electronically identifying one or more items of video content responsive to the received query and to the one or more alternative queries;
    electronically generating a result set comprising one or more links to the one or more items of video content responsive to the received query;
    electronically identifying the one or more links in the result set associated with items of premium video content;
    electronically filtering the one or more links in the result set associated with items of premium video content on the basis of information associated with the user from which the query was received that is maintained in a user profile, wherein the filtering includes placing a link associated with one of the items of premium video content in a paid position in the result set based on metadata associated therewith, the metadata indicating a position paid for by the content provider, the position in the result set based on the one or more terms in the query received from the given user; and
    electronically identifying one or more given items of premium video content the user is unable to access associated with the one or more links identified in the result set, the one or more given items of premium video content are identified along with the one or more links in the result set.

2. The method of claim 1 wherein receiving a query comprises receiving a query from a user of a client device.

3. The method of claim 1 wherein identifying one or more items of video content responsive to the received query comprises identifying one or more items of video content associated with one or more items of metadata that match or are similar to the one or more terms comprising the query.

4. The method of claim 3 wherein a given item of metadata comprises data identifying a content provider associated with a given item of video content.

5. The method of claim 3 wherein a given item of metadata comprises data identifying a given item of video content.

6. The method of claim 5 wherein data identifying the given item of video content comprises a title of the item of video content.

7. The method of claim 5 wherein data identifying the given item of video content comprises a summary of the item of video content.

8. The method of claim 3 wherein a given item of metadata comprises data identifying a subscription restriction associated with a given item of video content.

9. The method of claim 3 wherein a given item of metadata comprises data identifying licensing information associated with a given item of video content.

10. The method of claim 1 wherein generating a result set comprises retrieving one or more links to the one or more items of video content and associated metadata responsive to the received query.

11. The method of claim 1 wherein a given item of premium video content comprises an item of video content for which payment is required.

12. The method of claim 1 wherein a given item of premium video content comprises an item of video content for which a subscription is required.

13. The method of claim 1 wherein identifying the one or more links in the result set comprises identifying the one or more links to items of video content associated with metadata identifying the items of video content as premium items of video content.

14. The method of claim 1 wherein information associated with the user maintained in a user profile comprises an indication of whether the user is associated with a subscription for a given item of premium video content.

15. The method of claim 1 wherein information associated with the user maintained in a user profile comprises payment information.

16. The method of claim 1 comprising distributing the result set.

17. The method of claim 16 wherein distributing the result set comprises transmitting the result set to a client device associated with the user from which the query was received.

* * * * *